(12) United States Patent
Sopko et al.

(10) Patent No.: US 8,197,940 B2
(45) Date of Patent: Jun. 12, 2012

(54) AQUEOUS SUSPENSION FOR PYROLYTIC SPRAY COATING

(75) Inventors: John F. Sopko, Trafford, PA (US); Patricia R. Athey, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 830 days.

(21) Appl. No.: 12/179,669

(22) Filed: Jul. 25, 2008

(65) Prior Publication Data

US 2010/0021746 A1 Jan. 28, 2010

(51) Int. Cl.
*B32B 15/00* (2006.01)
(52) U.S. Cl. .................... 428/426; 428/432
(58) Field of Classification Search .......... 428/432
See application file for complete search history.

(56) References Cited

U.S. PATENT DOCUMENTS

| | | | |
|---|---|---|---|
| 3,652,246 A | 3/1972 | Michelotti et al. | |
| 3,796,184 A | 3/1974 | Hawkins | |
| 4,111,150 A | 9/1978 | Donley et al. | |
| 4,235,945 A * | 11/1980 | Wagner et al. | 427/126.3 |
| 4,239,816 A * | 12/1980 | Breininger et al. | 427/168 |
| 5,356,718 A | 10/1994 | Athey et al. | |
| 6,465,088 B1 * | 10/2002 | Talpaert et al. | 428/307.3 |
| 6,875,319 B2 | 4/2005 | Nadaud et al. | |
| 2002/0114945 A1 * | 8/2002 | Greenberg et al. | 428/336 |
| 2002/0114956 A1 | 8/2002 | Tomonaga et al. | |
| 2002/0127343 A1 | 9/2002 | Kutilek et al. | |
| 2003/0082367 A1 * | 5/2003 | Talpaert et al. | 428/328 |
| 2004/0043260 A1 * | 3/2004 | Nadaud et al. | 428/701 |

FOREIGN PATENT DOCUMENTS

| | | |
|---|---|---|
| JP | 06-279990 | 10/1994 |
| JP | 09-071441 | 3/1997 |
| WO | 98/11031 A1 | 3/1998 |
| WO | 98/41480 A1 | 9/1998 |
| WO | 02/24971 A1 | 3/2002 |
| WO | 2007/010462 A2 | 1/2007 |

OTHER PUBLICATIONS

PCT International Search Report, PCT/US2009/051141 dated Mar. 4, 2010.

* cited by examiner

*Primary Examiner* — Timothy Speer
(74) *Attorney, Agent, or Firm* — Andrew C. Siminerio

(57) ABSTRACT

The durability of a transparent pyrolytic spray applied coating is improved by providing a spray solution of metal acetylacetonates having different particle size distribution. More particularly, the particle size distribution of each of the metal acetylacetonates is a function of its melting temperature, and optionally of its melting temperature and solubility.

9 Claims, 2 Drawing Sheets

AQUEOUS SUSPENSION FOR PYROLYTIC SPRAY COATING

BACKGROUND OF THE INVENTION

1. Field of the Invention

This invention relates to an aqueous suspension having two or more solid organometallic precursors, e.g. metal acetylacetonates; the aqueous suspension used in a pyrolytic spray coating process to deposit optically thin coating films, and more particularly, to an aqueous suspension having two or more solid metal acetylacetonates milled or ground to a particle size based on a chemical property of the metal acetylacetonates to deposit optically thin coating films having improved durability.

2. Discussion of the Presently Available Technology

Pyrolytic coating is a method of applying a coating onto a surface of a hot glass substrate, e.g. a continuous glass ribbon, or a glass sheet, generally heated to 1112° Fahrenheit (F); (600° Centigrade (C)) to deposit one or more optically thin coating films on a surface of the substrate. At the present time there are two general types of pyrolytic coating processes, commonly referred to as pyrolytic vapor coating process and pyrolytic spray coating process. In the present practice of depositing optically thin coating films on the surface of the heated glass substrate, the organometallic precursors are preferably in a liquid or a vapor. More particularly, in the pyrolytic vapor coating process, a vapor having organometallic precursors is directed onto the surface of the heated glass substrate, and in the pyrolytic spray coating process, a liquid having organometallic precursors is directed onto the surface of the heated glass substrate. The heat from the glass substrate decomposes the organometallic precursors, and the metals from the precursors oxidize and bond to the surface of the substrate. A detailed discussion of a pyrolytic vapor coating process is presented in U.S. Pat. No. 5,356,718, and a detailed discussion of a pyrolytic spray coating process is presented in U.S. Pat. Nos. 4,111,150; 3,652,246 and 3,796,184, the disclosures of which are hereby incorporated by reference. Of particular interest in the present discussion is the pyrolytic spray coating process.

In general, the organometallic precursors used in the pyrolytic spray coating process are metal acetylacetonates (hereinafter "acetylacetonate" is also referred to as "AcAc") or beta di-ketonates or neodecanoates. Of particular interest in this discussion are the metal AcAc. Metal AcAc's are soluble in organic solvents and considered non-soluble in water; however, for health and safety reasons, it is preferred to use water instead of organic solvents. In the instance when the precursors are non-soluble in water, particularly at room temperature, such as metal AcAc's, the metal AcAc's are milled or ground, and mixed in water to provide an aqueous suspension. Dry metal AcAc's can be milled or ground to provide particles in a desired micron range, and the milled dry metal AcAc's mixed in water, or the metal AcAc's can be mixed in water to provide a mixed slurry, and the mixed slurry moved through a media mill to provide an aqueous suspension having the milled particles of the metal AcAc's. In both instances, the particles of the metal AcAc's are in the same micron range. During the pyrolytic coating process, the aqueous suspension is passed through the nozzles of a coating apparatus, e.g. of the type disclosed in U.S. Pat. No. 4,111,150, to apply or deposit one or more optically thin coating films on the surface of a glass substrate, e.g. a continuous glass ribbon.

Although the optically thin coating films obtained using aqueous suspensions prepared as discussed above are acceptable, it would be advantageous to provide an aqueous suspension of metal AcAc's that provides optically thin coating films that have improved durability over the optically thin coating films presently obtained.

SUMMARY OF THE INVENTION

This invention relates to a coated article having, among other things a sprayed pyrolytic transparent film over a glass substrate, the film having a crystal structure, wherein crystals of the crystal structure have a size is in the range of 15 to less than 25 nanometers ("nm").

Further, this invention relates to a pyrolytic coating suspension including, among other things, a liquid or semi-liquid, and particles of two organometallic precursors in the liquid or semi-liquid, wherein the particles of the two precursors have different mean particle size distributions.

Still further this invention relates to a method of making a pyrolytic coating suspension of organometallic precursors. The method includes, among other things, providing powders of the organometallic precursors to be mixed in a liquid or semi-liquid to provide the suspension; determining melting temperatures in degrees centigrade of the organometallic, wherein the organometallic precursor with the lowest melting temperature is designated as the base organometallic precursor; determining particle size distribution for each of the organometallic precursors, wherein the particle size distribution of the base organometallic precursors is designated as one, and the particle size distribution of each of the remaining metal acetylacetonate is determined by multiplying the particle size distribution of the base organometallic precursors by a particle size factor assigned to each of the organometallic precursors other than the base organometallic precursor, wherein the particle size factor has a value less than 1; providing particles of the organometallic precursors in their respective particle size distribution range, and mixing the particles of the organometallic precursors in their respective particle size distribution range in water to provide the pyrolytic coating suspension.

In addition, this invention relates to an improved method of pyrolytically coating a transparent coating on a glass substrate. The method which is improved by this invention includes, among other things, positioning a spray coating apparatus over a heated glass substrate; providing a pyrolytic coating suspension having particles of organometallic precursors in a liquid or semi-liquid; moving the pyrolytic coating suspension through coating nozzle of the coating apparatus toward a surface of the glass substrate, and applying an optical coating onto the surface of the heated glass substrate. The improvement made by the invention is an improved pyrolytic coating suspension made by, among other things, providing powders of the organometallic precursors to be mixed in the liquid or semi-liquid to provide the suspension; determining melting temperatures in degrees centigrade of the organometallic, wherein the organometallic precursor with the lowest melting temperature is designated as the base organometallic precursor; determining particle size distribution for each of the organometallic precursors, wherein the particle size distribution of the base organometallic precursors is designated as one, and the particle size distribution of each of the remaining metal acetylacetonate is determined by multiplying the particle size distribution of the base organometallic precursors by a particle size factor assigned to each of the organometallic precursors other than the base organometallic precursors, wherein the particle size factor has a value less than 1; providing particles of the organometallic precursors in their respective particle size distribution range, and mixing the particles of the organometallic precursors in their respective particle size distribution range in water to provide the pyrolytic coating suspension.

DETAILED DESCRIPTION OF THE INVENTION

Figure 1:
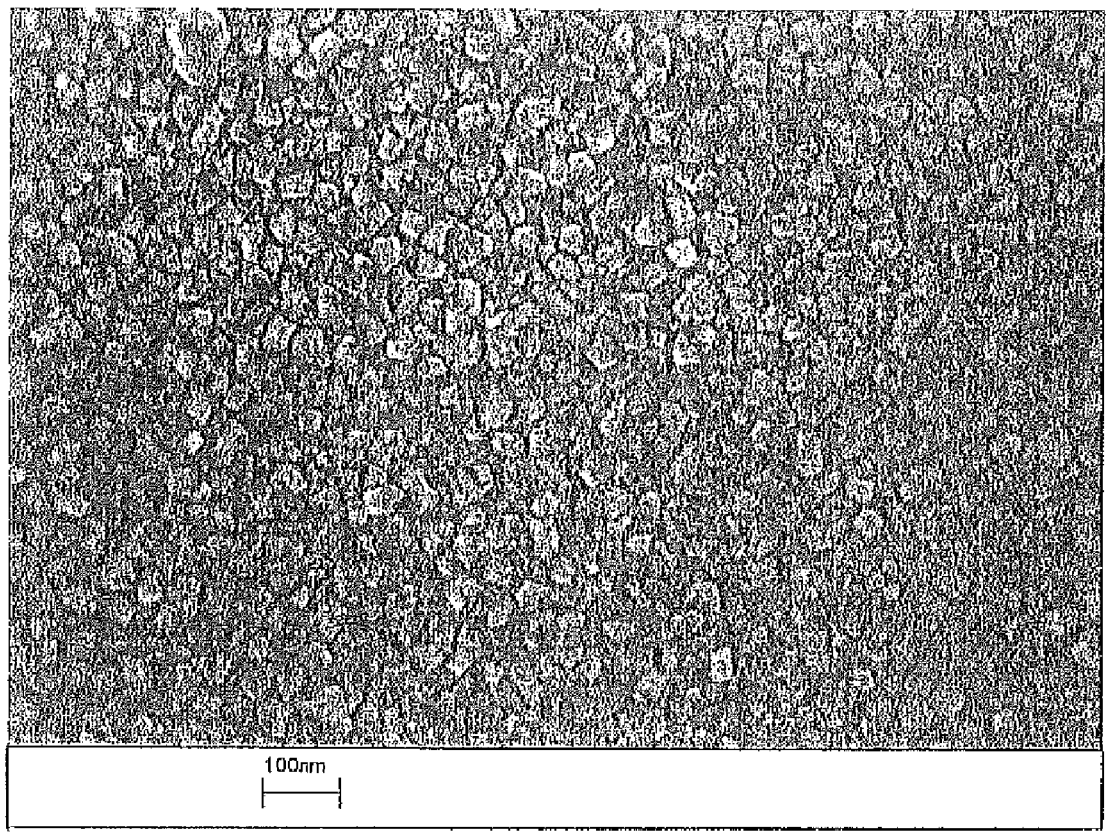
FIG. 1 is a copy of a photograph of a crystal structure of a sample of a prior art annealed Solarcool® coated glass. The photograph was taken using a field emission scanning electron microscope.

All numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired property sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms "mounted over", "positioned over", or "provided over" mean mounted, positioned, or provided on but not necessarily in surface contact with. For example, one article or component of an article "provided over" another article does not preclude the presence of materials between the articles, or between components of the article, respectively.

Organometallic precursors used in the pyrolytic spray coating process include metal acetylacetonates (hereinafter "acetylacetonate" is also referred to as "AcAc"), beta diketonates and neodecanoates. Although the following discussion is directed to metal AcAc's, the invention is not limited thereto, and the invention can be practiced using beta diketonates and neodecanoates. In the pyrolytic spray coating process, the metal AcAc's, which are considered insoluble in water at room temperature are individually weighed as a powder. Optionally, the powders of the metal AcAc's are blended and milled to a particle size within a desired micron range, or within a mean distribution, and the blended-milled AcAc's are mixed with water to provide an aqueous coating suspension, or the powders of the metal AcAc's are blended and mixed with water to provide a mixed slurry, and the slurry moved through a media mill to mill the metal AcAc's to provide an aqueous coating suspension having metal AcAc's milled to a particle size within a desired micron range, or within a mean distribution.

By way of illustration and not limiting to the invention, an aqueous suspension used in a pyrolytic spray coating process to make coated glass sheets sold by PPG Industries, Inc under the registered trademark Solarcool® includes particles of cobalt acetylacetonate ($Co(C_5H_7O_2)_3$) (also referred to as "CoAcAC"), iron acetylacetonates ($Fe(C_5H_7O_2)_3$) (also referred to as "FeAcAC") and chromium acetylacetonates ($Cr(C_5H_7O_2)_3$) (also referred to as "CrAcAC"). In one non-limiting embodiment of the invention, the Solarcool® coated clear glass in the reflective mode near normal has a tristimulus Y between 32% and 38%, and is within the area of the chromaticity diagram, Illuminant "C" defined by the following x and y coordinates (x=0.308, y=0.328); (x=0.326, y=0.338); (x=0.310, y=0.325); (x=0.324, y=0.341). The term "near normal" means that the glass is viewed along a straight line, and the straight line and the surface of the coated glass subtend an angle of about 82°.

Although the durability of the presently available pyrolytic coating films is acceptable, it is appreciated by those skilled in the art that it would be advantageous to improve the durability of the pyrolytic coating films. Although a glass has not been coated with the pyrolytic coating suspension of the invention, it is expected that the crystallinity of a coated glass made using the pyrolytic coating suspension of the invention will be improved, which is expected to improve the density of the coating films, which is expected to improve the durability of the coating films. In a non-limiting embodiment of the invention the crystallinity of the pyrolytic coating films is improved by reducing the variation in the size distribution of the crystals and/or by providing a more uniform organization or crystal formation. In another non-limiting embodiment of the invention, the durability of the coating is improved by improving the resistance of the pyrolytic coating films to the migration of foreign substances, e.g. water through the surface of the coating into the crystal structure of the coating. More particularly, the foreign substances migrate through cracks in the coatings, through the crystal structure, and attack the glass at the glass coating interface. As is appreciated by those skilled in the art, the surfaces of coatings having large size distribution of crystals have a higher probability of surface cracks than surfaces of coatings having smaller size distribution of crystals, and have a higher probability that the surface cracks are larger than the surface cracks of coatings having smaller size distribution of crystals.

As is appreciated, the invention is not limited to the manner in which the crystal structure of the coating on the glass is determined. For example in one non-limiting embodiment of the invention the crystal structure of the coating is determined in the following manner. A 10 millimeter ("mm") square sample is cut from a coated glass piece. The uncoated surface of the sample is mounted on a platform by a carbon sticky tape, and the sides of the sample are painted with a carbon paint of the type used in the art. Electron images of the coating from the top of the sample are taken using a field emission scanning electron microscope.

Shown in FIG. 1 is a copy of a photograph of a crystal structure of a sample of a prior art Solarcool® coated glass. The sample was prepared as discussed above and photographed using a field emission scanning electron microscope. As shown in FIG. 1, the crystal structure of the coating film generally has a large size distribution of crystals ranging approximately 25 to 45 nanometers ("nm") in size. The size of the crystals in FIG. 1 can be determined by using the 100 nm scale shown in FIG. 1. The crystal structure of the coating film of the invention is expected to exhibit a more narrow size distribution of crystals in the range of 15 to less than 25 nm in size, and preferably in the range of 15 to 20 nm, and a more uniform organization or crystal formation.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation.

For a better appreciation of the invention, the following discussion is presented. The coating aqueous suspension used in the manufacture of Solarcool® glass includes particles of CoAcAc, FeAcAc and CrAcAc within the same micron range, e.g. a range of 0.8-1.2 microns, or within the same mean size, e.g. 1.0 microns. It has been observed that the ratio of cobalt to iron to chromium in the aqueous suspension used in the pyrolite coating process to manufacture Solarcool® glass is not the same ratio of cobalt to iron to chromium in the optically thin coating film of the Solarcool® glass. It has further been observed, that generally the difference between the amount of iron in the aqueous suspension and the amount of iron in the coating is less than the difference between the amount of cobalt in the suspension and the amount of cobalt in the coating, and that the difference between the amount of cobalt in the suspension and the amount of cobalt in the coating is less than the difference between the amount of chromium in the suspension and the amount of chromium in the coating.

A study of the properties of FeAcAc, CoAcAc and CrAcAc (1) identified FeAcAc as having a lower melting point than CoAcAc, and CoAcAc as having a lower melting point than CrAcAc, and (2) identified FeAcAc as having a higher solubility in water than CoAcAc, and CoAcAc as having a higher solubility in water than CrAcAc (see Table below).

Based on the above observations and study, it is theorized that a limitation with the present process of preparing an aqueous suspension of 2 or more metal AcAc's is the grinding or milling of the metal AcAc's to the same micron size range, or the same mean value. More particularly, to obtain an optically thin pyrolytically sprayed coating film, it is preferred to move the substrate and the coating nozzles relative to one another. As the coating aqueous suspension having the metal AcAc is sprayed over the surface of the substrate, the particles of the metal AcAc having the lowest melting point are expected to completely melt before the particles of the metal AcAc's in the coating aqueous suspension having a higher melting point completely melt. This is because the particles of the metal AcAc's in the suspension having the different melting points have the same particle size and are exposed to the same temperature for the same period of time. The metal AcAc particles completely melting at different times disrupts the crystal growth of the optically thin coating film resulting in a less dense and less durable optically thin coating film on the surface of the substrate. The effect of this limitation is expected to increase in severity as the differences between the melting points of the two or more metal AcAc's in the suspension increases. Although the metal AcAC's have some solubility in water, because of their low solubility in water, in the preferred practice of the invention, but not limiting to the invention, the solubility of the metal AcAc's is considered less of a factor. As can be appreciated as the solubility of the metal AcAc's selected for use in the practice of the invention increases, more consideration has to be given to the solubility of the metal AcAc's in the aqueous suspension.

In the preferred practice of the invention, the difference in time between the complete melting of the metal AcAc's is minimized if not eliminated. In this manner, the crystallinity of the optically thin pyrolytic coating film is expected to be improved, which is expected to improve the density of the coating film, which is expected to improve the durability of the coating film.

Figure 2:
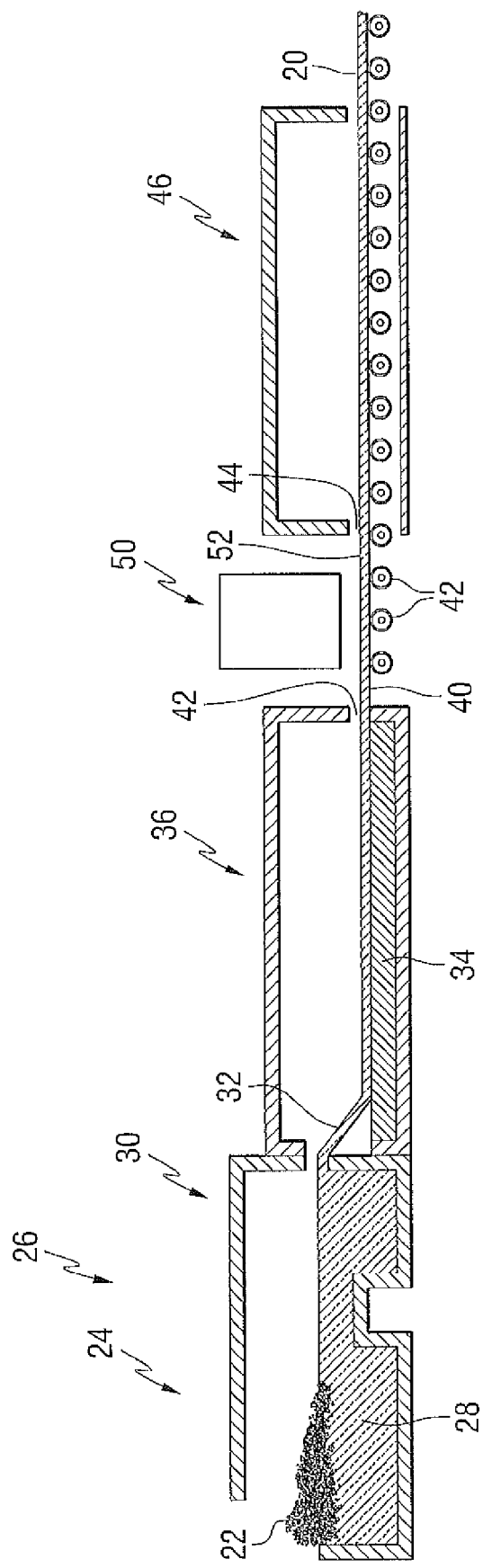
FIG. 2 is side view of a continuous flat glass production line having portions removed for purposes of clarity, the production line having a pyrolytic coating apparatus.

In the following discussion, non-limiting embodiments of the invention are directed to depositing an optically thin pyrolytic coating film on the surface of a continuous glass ribbon as it moves between the exit end of a float glass forming chamber and the entrance end of an annealing lehr. With reference to FIG. 2, the process of making a glass ribbon 20 includes melting glass batch materials 22 in the melter section 24 of a furnace 26, moving the molten glass 28 to refiner section 30 of the furnace 26, and delivering refined molten glass 32 onto a pool of molten metal 34 contained in a glass-forming chamber 36. As the molten refined glass 32 moves through the glass-forming chamber 36 on the pool of molten metal 34, it is sized and cooled. A dimensionally stable sized glass ribbon 40 moves out of exit end 42 of the glass-forming chamber 36 into entrance end 44 of an annealing lehr 46. As is appreciated, the invention is not limited to the process of making a glass ribbon, and any of the glass making processes known in the art can be used in the practice of the invention.

Although not limiting to the invention, an optically thin coating film is applied by a coating apparatus 50 onto surface 52 of the glass ribbon 40 as it advances on conveyor rolls 42 from the exit end 42 of the glass-forming chamber 36 to the entrance end 44 of the annealing lehr 46. In general, the glass ribbon 40 moving between the exit end 42 of the glass-forming chamber 36 and the entrance end 44 of the annealing lehr 46 moves at rates of up to 600 inches (15 meters) per minute depending on the thickness of the glass ribbon. For example and not limiting to the invention, a glass ribbon moving at a rate of 600 inches (15 meters) per minute is expected to have a thickness of 0.125 inch (3.2 millimeters (mm)), and a glass ribbon moving at a rate of 300 inches (7.5 meters) per minute is expected to have a thickness of 0.250 inch (6.4 mm). The pyrolytic coating process is usually practiced on a glass ribbon having a thickness in the range of 0.087 to 0.984 inch (2.2 to 25.0 mm). A glass ribbon in this thickness range is expected to move at a rate in the range of 140 to 750 inches (2.55 to 19 meters) per minute.

The glass ribbon regardless of its thickness is expected to have a temperature of 1100° Fahrenheit (F) (593° Centigrade (C)) at the exit end of the glass-forming chamber, and a temperature of 1000° F. (537° C.) at the entrance end of the annealing lehr. As is appreciated by those skilled in the art, the temperature profile of the glass ribbon is slightly altered during the pyrolytic coating process. More particularly, for glass ribbons having a thickness in the range of 0.087 to 0.394 inch (2.2 to 10.0 mm), the temperature of the glass ribbon at the exit end of the forming chamber is expected to be in the range of 1080 to 1120° F. (562 to 604° C.), and the temperature of the glass ribbon at the entrance end of the annealing lehr is expected to be in the range of 1100 to 1110° F. (593 to 598° C.).

Non-limiting embodiments of the invention are directed to preparing pyrolytic coating suspensions having particles of metal AcAc's mixed in a liquid or semi-liquid medium. As can be appreciated, the invention is not limited to any specific metal AcAc and/or the number of metal AcAc's in the liquid or semi-liquid medium. Still further, non-limited embodiments of the invention are directed to spraying the pyrolytic coating suspension onto a surface of the glass ribbon using a coating apparatus of the type disclosed in, and shown in FIG. 3 of, U.S. Pat. No. 4,111,150. As is appreciated, the invention is not limited to any particular type of coating apparatus and any of the types used in the art of pyrolytic coating, e.g. as disclosed in, but not limited to, U.S. Published Patent Application No. 2002/0127343 A1 can be used in the practice of the invention to apply an optically thin pyrolytic coating film on the surface of a glass substrate, e.g. but not limiting to the invention, a continuous glass ribbon.

In the following discussion of non-limiting embodiments of the invention, an aqueous suspension of CoAcAC, FeAcAC and CrAcAC is made to coat a glass ribbon to provide a Solarcool® coated glass; however, as is appreciated by those skilled in the art, the invention is not limited thereto, and the invention contemplates making aqueous suspensions of powders of different metal AcAc's. As is appreciated from the above discussion, the present technique for preparing the aqueous suspension provides for milling powders of CoAcAC, FeAcAC and CrAcAC to a particle size within the same range, e.g. 0.800-1.200 microns, or having the same mean value, e.g. 1.000 microns. In the practice of the present non-limiting embodiment of the invention, the powders of CoAcAC, FeAcAC and CrAcAc are ground or milled to particle sizes in different micron ranges, or different mean sizes depending on their melting temperature.

The following Table presents the melting temperatures, and the solubility in water, of CoAcAc, FeAcAc and CrAcAc, which are of interest in the practice of the non-limiting embodiments of the invention.

TABLE

| MILLING POWDER | MELTING POINT | SOLUBILITY IN WATER (grams of AcAc in 100 grams of water) |
| --- | --- | --- |
| CoAcAc | 215° C. (418° F.) | 0.3 |
| FeAcAc | 180° C. (356° F.) | 3.5 |
| CrAcAc | 218° C. (356° F.) | 0.15 |

Based on the above theoretic discussion, pyrolytically coating a glass ribbon with an aqueous suspension of CoAcAc, FeAcAc and CrAcAc of the same concentration and particles of the same size, it is expected that more Fe oxide will be deposited on the surface of the glass ribbon than Co oxide and Cr oxide because FeAcAc has a lower melting temperature, and it is expected that a slight more Co oxide will be deposited on the surface of the glass ribbon than Cr oxide because CoAcAc has a slightly lower melting point. Still further, based on the above theoretic discussion, pyrolytically coating a glass ribbon with an aqueous suspension of particles of CoAcAc, FeAcAc and CrAcAc of the same size, it is expected that the crystallinity of Fe oxide will have less variation in their size distribution than the crystallinity of the Co oxide and the Cr oxide because Fe oxide will have more time than the Co oxide and the Cr oxide to from its crystal preference. The Fe oxide has more time to form its crystal preference than the CoAcAc and CrAcAc because FeAcAc has a lower melting temperature, and at a ribbon temperature of 1080° F. (582° C.) will melt at a faster rate than the CoAcAc, and CrAcAc, and the $Fe^{++}$ will have more time than $Co^{++}$ and $Cr^{++}$ to react with the oxygen in the glass. It is expected that Co oxide will have more time to form its crystal preference than Cr oxide because CoAcAc has a lower melting point than CrAcAc. As is appreciated, any suspension and/or products of reaction in the atmosphere of the coating area are removed from the coating area by the exhaust system of the coating apparatus.

As is appreciated, the temperature of the glass ribbon is not easily varied to accommodate the different melting points of the metal AcAcs; therefore, the metal AcAcs have to be modified based on their respective melting temperature. More particularly, the crystallinity of the Co oxide and the Cr oxide is improved by milling the particles of the CoAcAc to a particle size within a range having lower limits, or a particle size having a lower mean value, than the FeAcAc, and milling the CrAcAc to a particle size within a range having lower limits, or a particle size having a mean value less than the CoAcAc. In the preferred non-limiting embodiment of the invention under discussion, the FeAcAc is the reference or base component because the FeAcAc has a melting temperature lower than the melting temperature of CoAcAc and CrAcAc.

Although not limiting to the invention, the preferred particle size of the FeAcAc can be determined by milling the FeAcAc to different particle sizes within different ranges, making an aqueous suspension for each of the particles in the different ranges, and coating a heated glass sheet or glass ribbon with the different suspensions. The crystallinity of the coatings is examined by X-ray diffraction and/or field emission microscope, and the aqueous suspension that provides the preferred crystallinity, i.e. the resultant crystals exhibit a more narrow size distribution, e.g. within the range of 15 to less than 25 nm, and a more uniform organization or crystal formation, is the preferred particle size of the FeAcAc. In one non-limiting embodiment of the invention, the selected particle size of the FeAcAc is in the range of 1.000 micron plus or minus 0.200 microns and preferably 1.000 micron plus or minus 0.100 micron, and more preferably 1.000 micron plus or minus 0.050 microns. In another non-limiting embodiment of the invention, the selected particle size of FeAcAc has a mean value of 1.000 micron plus or minus 0.200 microns and preferably a mean value of 1.000 micron plus or minus 0.100 micron, and more preferably a mean value 1.000 micron plus or minus 0.050 microns. As can be appreciated, as the range of particle size narrows, and/or the range of the mean value narrows, the ground particles can be passed through a filter to separate particles of the desired size. Further, as is appreciated the invention is not limited to the manner in which the particle size is measured. For example and not limiting to the invention, the mean value of the particle size of the ground metal AcAc's can be measured using a Laser diffraction particle size analyzer.

As is appreciated by those skilled in the art, particles having a size in the range 1.000 micron plus or minus a tolerance, e.g. 0.200 microns have a different distribution than particles having a mean value of 1.000 micron plus or minus a tolerance, e.g. 0.200 microns. More particularly, particles in the range of 0.800 to 1.200 microns means that 100% of the particles have a size that falls within the range of 0.800-1.200 microns, but the distribution of the particle size within the range is not limited. For example and not limiting to the invention, particles in the range of 0.800 to 1.200 microns can have 100% of the particles within the range of 0.800-1.000 micron, or 100% of the particles within the range of 1.000-1.200 microns, or 50% of the particles can be in the range of 0.800-1.000 micron and 50% within the range of 1.100-1.200 microns. A mean value of 1.000 micron plus or minus a tolerance, e.g. 0.200 microns, on the other hand, means that the distribution of the sizes of the ground or milled particles in the range of 0.800 to 1.200 microns has a bell shape curve distribution with the peak of the bell shaped curve at 1.000 micron and the outer limits of the bell shaped curve at 0.800 and 1.200 microns. Bell shaped curves and statistical analyses of bell shaped curves are well known and no further discussion is deemed necessary.

As mentioned above the particle size of the preferred FeAcAc can have a mean value of 1.000 micron plus or minus 0.200 micron. For each 10 degree Centigrade difference between the melting point of the base metal AcAc and one of the other metals AcAc, one point is assigned. For example and not limiting to the invention, the difference between the melting temperatures of FeAcAc and CoAcAc is 35 degrees centigrade (see Table above), and 3.500 points are assigned to CoAcAc, and the difference between the melting temperature of FeAcAc and CrAcAc is 38 degrees centigrade and 3.800 points are assigned to CrAcAc. The melting temperature points are divided by 100 and the quotient subtracted from 1,000.

The particle size factor for CoAcAc is 1.000−(3.500/100) equals 0.965, and the particle size factor for CrAcAc is 1.000−(3.800/100) equals 0.962. The mean value of the particle size of the CoAcAc is preferably 0.965 times the mean value of the particle size of the FeAcAc making the mean value of the particle size of CoAcAc 0.965 plus or minus 0.200 micron, the preferred mean value of CoAcAc 0.965 plus or minus 0.100 micron, and the more preferred mean value of CoAcAc 0.965 plus or minus 0.050 micron. The mean value of the particle size of the CrAcAc is preferably 0.962 times the mean value of the particle size of the FeAcAc making the mean value of the particle size of CrAcAc 0.962 plus or minus 0.200 micron, the preferred mean value of CrAcAc 0.962 plus or minus 0.100 micron, and the more preferred mean value of CrAcAc 0.962 plus or minus 0.050 micron. As can be appreciated, the distribution range of particle size for CoAcAc is 0.965 plus or minus 0.200 micron, the preferred distribution range of particle size for CoAcAc is 0.965 plus or minus 0.100 micron, and the more preferred distribution range of particle size for CoAcAc is 0.965 plus or minus 0.050 micron. Further as can be appreciated, the distribution range of the particle size for CrAcAc is 0.962 plus or minus 0.200 micron, the preferred distribution range of particle size for CrAcAc is 0.962 plus or minus 0.100 micron, and the more preferred distribution range of the particle size for CrAcAc is 0.962 plus or minus 0.050 micron.

In another non-limiting embodiment of the invention the melting point and the solubility are taken into account to reduce the particle size of the CoAcAc and CrAcAc. More particularly and as previously discussed, for each 10 degree centigrade difference between the melting point of the base metal AcAc (the AcAc having the lowest melting point) and the other metal AcAc, one point is assigned. The difference between AcAc having the highest solubility in water and the other metal AcAc is assigned a different weight factor than the weight factor assigned to the difference between the melting point of two metal AcAc's. More particularly, metal AcAc's have a low solubility in water and are generally considered insoluble in water. Therefore, to recognize differences between solubility of metal AcAc's in water, and the time to evaporate the water to release the metal AcAc, a different weight factor is assigned to differences in solubility.

In one non-limiting embodiment of the invention, one point is assigned for each 1 gram per 100 grams of water solubility difference. For the difference between the solubility of FeAcAc and CoAcAc, 3.200 points are assigned to CoAcAc, and for the difference between the solubility of FeAcAc and CrAcAc, 3.350 points are assigned to CrAcAc. The melting temperature points are multiplied by the solubility points, and the product divided by 100 and the quotient subtracted from 1. The particle size factor for CoAcAc is 1.000−(3.200)(3.500)/100) equals 0.888 and the particle size factor for CrAcAc is 1.000−((3.350)(3.800)/100) equals 0.873. The particle size of the CoAcAc is preferably 0.888 times the particle size of the FeAcAc, and the particle size of the CrAcAc is preferably 0.873 times the particle size of the FeAcAc.

Based on the forgoing, the mean value of the particle size of CoAcAc is 0.888 plus or minus 0.200 micron, the preferred mean value of CoAcAc is 0.888 plus or minus 1.000 micron, and the more preferred mean value of CoAcAc is 0.888 plus or minus 0.500 micron; the mean value of the particle size of CrAcAc is 0.873 plus or minus 0.200 micron, the preferred mean value of CrAcAc is 0.873 plus or minus 0.100 micron, and the more preferred mean value of CrAcAc is 0.873 plus or minus 0.050 micron. As can be appreciated, the distribution range of particle size for CoAcAc is 0.888 plus or minus 0.200 micron, the preferred distribution range of particle size for CoAcAc is 0.888 plus or minus 0.100 micron, and the more preferred distribution range of particle size for CoAcAc is 0.888 plus or minus 0.050 micron. Further as can be appreciated, the distribution range of the particle size for CrAcAc is 0.873 plus or minus 0.200 micron, the preferred distribution range of particle size for CrAcAc is 0.873 plus or minus 0.100 micron, and the more preferred distribution range of the particle size for CrAcAc is 0.873 plus or minus 0.050 micron.

In the following practice of one non-limiting embodiment of the invention, only the difference in melting temperature between the metal AcAc's is considered. 160 grams of FeAcAc is mixed into 0.800 liters of water and the suspension milled to provide FeAcAc with a mean particle size of 1.000 micron plus or minus 0.200 micron; 630 grams of CoAcAc is mixed into 3.150 liters of water and the suspension milled to provide CoAcAc with a mean particle size of 0.965 micron plus or minus 0.200 micron, and 210 grams of CrAcAc is mixed into 1.050 liters of water and the suspension milled to provide CrAcAc with a mean particle size of 0.962 micron plus or minus 0.200 micron. The suspensions of FeAcAc, CoAcAc and CrAcAc are mixed together and the mixed suspension used to pyrolytically coat a thin optical coating film onto the surface of glass ribbon as it moved between exit end of the glass-forming chamber and the entrance end of the annealing lehr. The thin optical coating is expected to have better crystallinity and durability than the crystallinity and durability of a thin optical coating obtained by applying a suspension of FeAcAc, CoAcAc and CrAcAc milled particles having the same particle size.

In another non-limiting embodiment of the invention, powders of FeAcAc are milled to a mean particle size of 1.000 micron plus or minus 0.100 micron, powders of CoAcAc are milled to a mean particle size of 0.888 micron plus or minus 0.100 micron, and powders of CrAcAc are milled to a mean particle size of 0.873 micron plus or minus 0.100 micron. The milled metal AcAc's were blended together and mixed into 5 liters of water to provide the coating suspension. As can be appreciated the invention is not limited to the purity of water, however, in the preferred practice of the invasion, the water can be tap water, deionizer water, or demineralized water.

As can now be appreciated, the invention is directed to making and using a suspension of two or more metal AcAc's that have particle sizes as a function of one or more properties, e.g. melting point and/or solubility in water. The invention is not limited to the formulas presented herein, and other formulas or techniques can be developed within the teachings of the invention. For example and not limiting to the invention, suspensions of different metal AcAc's, e.g. but not limited to FeAcAc, CoAcAc and CrAcAc at different particle sizes can be individually mixed in water and used to pyrolytic coat a glass sheet.

Still further, the invention is not limited to the range of the mean value of the particle size. For example and not limiting to the invention, the coating suspension made above can include FeAcAc particles in the range of 1.000 micron plus or minus 0.050 micron; CoAcAc particles in the range of 0.888 micron plus or minus 0.050 micron, and CrAcAc particles in the range of 0.873 plus or minus 0.050 micron.

The coating of the invention has smaller crystal sizes to improve the durability of the coating by improving the resistance of the pyrolytic coating films to the migration of foreign substances, e.g. water moving through the coating to the glass coating interface. For example and not limiting to the invention, the resistance of coatings to the passage of water can be measured using the Cleveland Condensation Chamber ASTM D4585-99 test. The current pyrolytic sprayed coated glasses, e.g. of the type having a coating of FeAcAc, CrAcAc and CoAcAc have a failure, e.g. the coating separates from the glass substrate after 5-12 weeks in the chamber. It is expected that the coated article of the invention will fail, e.g. the coating will separate from the glass after 12-18 weeks in the chamber, and more likely after 13-15 weeks in the chamber.

As can be appreciated, the invention is not limited to the embodiments of the invention discussed herein, and the scope of the invention is only limited by the scope of the following claims.

What is claimed is:

1. In a coated article of the type having a first outer surface and an opposite second outer surface, a glass substrate comprising a first surface and an opposite second surface, and a sprayed pyrolytic transparent film over the first surface of the glass substrate, the film having a first surface and an opposite second surface, wherein the second surface of the film is over the first surface of the glass substrate and the first surface of the film is the first outer surface of the coated article, wherein the film is a mixed metal oxide film comprising oxides of iron, chromium and cobalt, the film having a crystal structure, wherein size of the crystals of the crystal structure is obtained by spraying the first surface of the glass substrate heated to a temperature of 1100° Fahrenheit (F) (593° Centigrade (C)) with an aqueous suspension of cobalt acetylacetonate ("CO AcAc"), iron acetylacetonate ("Fe AcAc") and chromium acetylacetonate ("Cr AcAc"), wherein particle size of the Co AcAc, Fe AcAc and Cr AcAc in the suspension have a same mean value, the improvement comprising:

crystals of the crystal structure of the film have a size in the range of 15 to 20 nanometers, wherein the size of the crystals of the crystal structure is obtained by spraying the first surface of the glass substrate heated to a temperature of 1100° Fahrenheit (F) (593° Centigrade) with an aqueous suspension of Co AcAc, Fe AcAc and Cr AcAc, wherein the particle size of the Co AcAc and of the Cr AcAc in the suspension have a lower mean value than the mean value of the particle size of the Fe AcAc in the suspension.

2. The coated article according to claim 1 wherein the coated article viewed in a reflective mode near normal has a tristimulus Y between 32% and 38%, and is within an area of chromaticity diagram, Illuminant "C" defined by following coordinates: (x=0.308, y=0.328); (x=0.326, y=0.338); (x=0.310, y=0.325); (x=0.324, y=0.341).

3. The coated article according to claim 1 wherein the film of a sample of the coated article subjected to Cleveland Condensation Chamber ASTM D4585-99 test for a period of 12 weeks has no separation from the glass substrate.

4. The coated article according to claim 1, wherein the second surface of the film is on the first surface of the glass substrate.

5. The coated article according to claim 4, wherein the second surface of the glass substrate is the second outer surface of the coated article.

6. The coated article according to claim 5 wherein the coated article viewed in a reflective mode near normal has a tristimulus Y between 32% and 38%, and is within an area of chromaticity diagram, Illuminant "C" defined by following coordinates: (x=0.308, y=0.328); (x=0.326, y=0.338); (x=0.310, y=0.325); (x=0.324, y=0.341).

7. The coated article according to claim 6 wherein the film of a sample of the coated article subjected to Cleveland Condensation Chamber ASTM D4585-99 test for a period of 12 weeks has no separation from the glass substrate.

8. The coated article according to claim 7 wherein the size of the crystal is measured from a photograph of an electron image of the film taken from top surface of the coated article using a field emission scanning electron.

9. The coated article according to claim 1 wherein, the particle size of Cr AcAc in the suspension has a lower mean value than the mean value of the particle size of the Co AcAc in the suspension.

* * * * *